US 8,295,885 B2

(12) United States Patent
Pearce

(10) Patent No.: US 8,295,885 B2
(45) Date of Patent: Oct. 23, 2012

(54) METHODS AND APPARATUS FOR PROVIDING RESTRICTIONS ON COMMUNICATIONS OF A WIRELESS COMMUNICATION DEVICE

(75) Inventor: Graham N Pearce, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 22 days.

(21) Appl. No.: 13/087,935

(22) Filed: Apr. 15, 2011

(65) Prior Publication Data
US 2011/0195698 A1 Aug. 11, 2011

Related U.S. Application Data

(63) Continuation of application No. 12/212,904, filed on Sep. 18, 2008, now Pat. No. 7,953,450, which is a continuation of application No. 10/732,960, filed on Dec. 11, 2003, now Pat. No. 7,440,778.

(60) Provisional application No. 60/432,613, filed on Dec. 12, 2002.

(51) Int. Cl.
H04M 1/00 (2006.01)
(52) U.S. Cl. ........ 455/565; 455/419; 455/420; 455/415; 455/550.1; 379/142.02; 379/142.06
(58) Field of Classification Search .................. 455/565, 455/550, 418, 415
See application file for complete search history.

(56) References Cited

U.S. PATENT DOCUMENTS

| 5,678,195 | A | 10/1997 | Suikkola et al. |
| 5,884,193 | A | 3/1999 | Kaplan |
| 5,950,126 | A | 9/1999 | Palviainen et al. |
| 6,081,731 | A * | 6/2000 | Boltz et al. ............. 455/565 |
| 6,295,447 | B1 | 9/2001 | Reichelt et al. |
| 6,311,055 | B1 | 10/2001 | Boltz |
| 7,036,143 | B1 | 4/2006 | Leung et al. |
| 7,325,058 | B1 * | 1/2008 | Sheth et al. ............. 709/225 |
| 2002/0165012 | A1 * | 11/2002 | Kirbas et al. .......... 455/565 |
| 2004/0184593 | A1 | 9/2004 | Elsey et al. |
| 2004/0198335 | A1 | 10/2004 | Campen |
| 2006/0210046 | A1 | 9/2006 | Smith |

OTHER PUBLICATIONS

International Preliminary Examination Report for PCT Application # PCT/CA2003/00184, Apr. 19, 2005.
Research in Motion, "BlackBerry Enterprise Server Version 3.6 for Microsoft Exchange", 2003, pp. 1-16.

* cited by examiner

Primary Examiner — Olumide T Ajibade Akonai
Assistant Examiner — Randy Peaches
(74) Attorney, Agent, or Firm — John J. Oskorep, Esq.

(57) ABSTRACT

Techniques in a wireless device for use in providing restrictions on communications via a cellular network are described. The wireless device communicates with a host enterprise server of a private network which is external to the cellular network for performing data synchronization in association with a personal information manager (PIM) application. The wireless device receives communication restriction information from this same host enterprise server in the private network, and stores this information in its memory. The wireless device determines whether a communication is restricted by comparing a user selected code of a communication attempt with one or more codes of the stored information. If the communication is determined to be restricted, the wireless device disallows the communication via the cellular network. If the communication is determined to not be restricted, the wireless device may allow the communication via the cellular network.

25 Claims, 5 Drawing Sheets

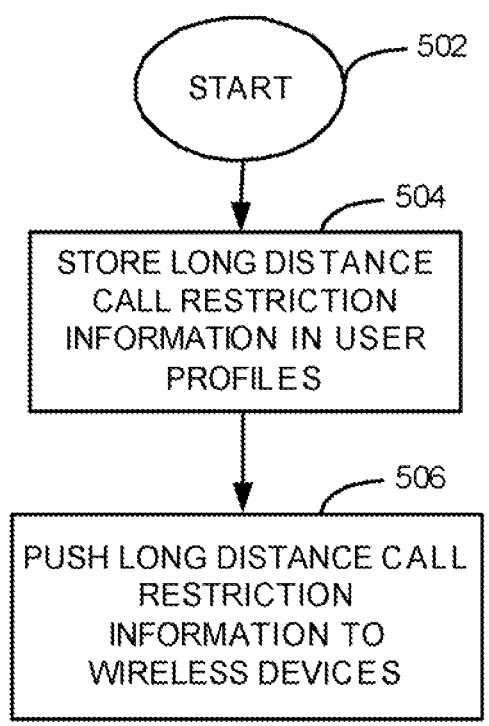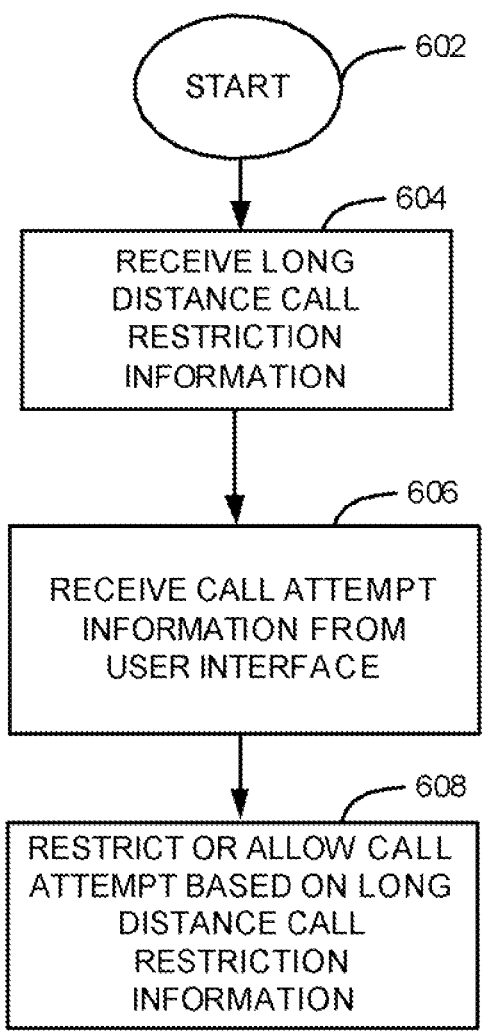

METHODS AND APPARATUS FOR PROVIDING RESTRICTIONS ON COMMUNICATIONS OF A WIRELESS COMMUNICATION DEVICE

CROSS REFERENCE TO RELATED APPLICATIONS

This patent application claims priority to and is a continuation of U.S. non-provisional patent application having application Ser. No. 12/212,904 and filing date of 18 Sep. 2008, now U.S. Pat. No. 7,953,450, which claims priority to and is a continuation of U.S. non-provisional patent application having application Ser. No. 10/732,960 and filing date of 11 Dec. 2003, now U.S. Pat. No. 7,440,778 B2, which claims priority to U.S. provisional patent application having application No. 60/432,613 and filing date of 12 Dec. 2002, each application being hereby incorporated by reference herein.

BACKGROUND

1. Field of the Technology

The present application relates generally to wireless communication devices, and relates more particularly to providing restrictions on long distance calls from a wireless communication device which operates in a wireless communication network.

2. Description of the Problem

There is a need for methods and apparatus for providing restrictions on long distance calls from wireless communication devices (e.g. combined voice and data communication capable devices) which operate in a wireless communication network.

BRIEF DESCRIPTION OF THE DRAWINGS

Embodiments of present invention will now be described by way of example with reference to attached figures, wherein:

FIG. 5 is a flowchart which describes a method of providing restrictions on long distance calls from a wireless communication device, which relates to the method employed at a host computer system; and FIG. 6 is another flowchart which describes a method of providing restrictions on long distance calls from a wireless communication device, which relates to a method employed at a wireless communication device.

DETAILED DESCRIPTION OF THE PREFERRED EMBODIMENTS

Figure 1:
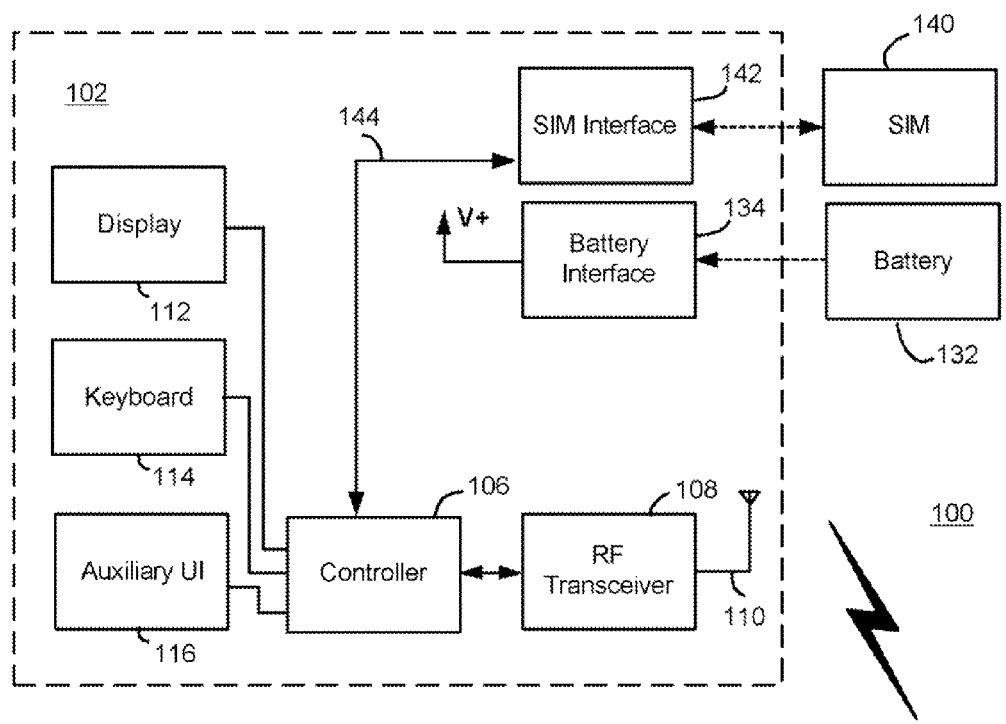
FIG. 1 is a block diagram of a communication system which includes a wireless communication device for communicating in a wireless communication network.
Figure 1:
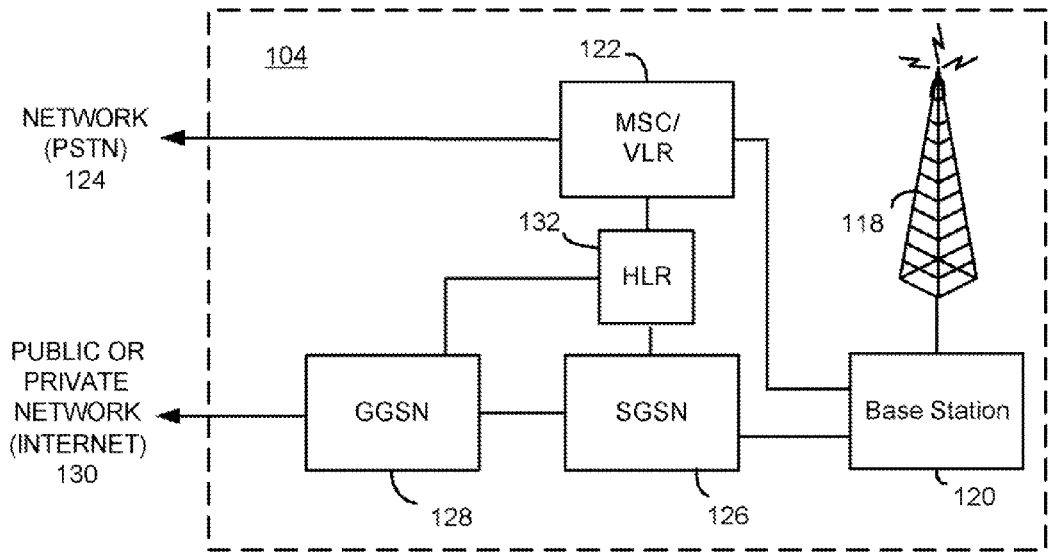

Methods and apparatus for providing restrictions on long distance calls from wireless communication devices which operate in a wireless communication network are described. The wireless devices are preferably combined voice and data communication devices. In one illustrative example, each wireless device receives and stores long distance call restriction information which is pushed from a private computer network through the wireless network. During typical operation, a wireless device determines whether call attempts from the wireless device are restricted by the long distance call restriction information. If a call attempt is restricted by the long distance call restriction information, the wireless device restricts the call attempt from the wireless device and provides for a call restriction alert indication (e.g. an alert tone or visual text). If the call attempt is not restricted by the long distance call restriction information, the wireless device allows the call attempt from the wireless device. Advantageously, control over long distance calls may be established on a per-user basis in the private home network.

General Approaches. The ability to control long distance telephone calls with combined wireless voice and data communication devices (e.g. GSM/GPRS configured devices) is a desirable step in the future for public or private groups (e.g. corporation's). It is preferred that such lie within Information Technology (IT) departments and those deploying the server of a private network. An IT policy pushed from the server to the devices is believed to be the bet vehicle for the delivery of the settings to control long distance calls. This server may be, for example, an otherwise conventional BlackBerry Enterprise Server.

The control over long distance calls from a device that can typically dial any number entered by the user may be handled as follows. Each user profile stored at the server in the private network contains long distance call restriction information, which is pushed to each corresponding wireless devices in the wireless communication network. This may be performed once, or periodically, or when updates exist. When the user hits the enter key to dial the destination phone number, the device checks the country code or area code to verify that it adheres to the policies of the group (e.g. the company). If the phone number does not adhere, then a message appears on the device and a tone alert sounds to let the user know that the number cannot be dialled.

The method allows the IT department to select the allowable/disallowable country codes or area codes through a graphic user interface that would have a database back end having a list of all country/area codes. For complete disabling of long distance abilities, the ability to enter the code for long distance access may be denied. For North America, this would mean e.g. that the ability to dial 011 is disabled; however, for North American based long distance dialling within North America a system for validating the area code being dialled is incorporated. Other restrictive categories include 900 toll numbers and 976 toll numbers.

For North America, the following selections may be provided: (1) All of North America; (2) Canada (Area Codes); (3) U.S.A (Area Codes); (4) Mexico (Area Codes); (5) Caribbean (Area Codes); (6) and Pacific (Area Codes). For Europe, the following selections may be provided: (1) All of Europe; (2) Scandinavian Countries; (3) Eastern Europe; (4) Western Europe; (5) and Individual Country selection. For South America, the following selections may be provided: (1) All of South America; and (2) individual countries of South America. For Asia, the following selections may be provided: (1) All of Asia; (2) South East Asia; (3) Middle East; (4) East India (India, Pakistan, Afghanistan); and (5) individual countries. For Africa, the following selections may be provided: (1) All of Africa; (2) North Africa; (3) West Africa; (4) East Africa; (5) Southern Africa; and (6) individual countries. For South Pacific, the following selections may be provided: (1) All; (2) Island Nations (Fuji, Bora Bora, Indonesia, etc.); and (3) individual, countries.

The device may include (1) a system to validate the phone number dialled before actually placing the call; (2) a database to store the IT policy information including the table of either acceptable or not acceptable numbers; (3) a display screen to allow the user to be notified when an incorrect number has been dialled; (4) an audible tone encase the person has dialled and then hit entered and is not looking at the screen.

Specific Applications. FIG. 1 is a block diagram of a communication system 100 which includes a wireless communication device 102 which communicates through a wireless communication network 104. Wireless communication device 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Communication system 100 provides wireless device 102 with the ability to place and receive telephone calls as well as send and receive data communications (e-mail messages, short message service (SMS) message, Internet data, etc.). When receiving data communications (e.g. e-mail), such information is typically "pushed" to wireless device 102.

In most modern communication devices, controller 106 is embodied as a central processing unit (CPU) which runs operating system software in a memory component (not shown). Controller 106 will normally control overall operation of wireless device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different user inputs.

Wireless device 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 will be adapted to particular wireless network or networks in which wireless device 102 is intended to operate.

When wireless device 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off until it is needed to receive signals or information (if at all) during designated time periods. Since power of wireless device 102 is normally provided by a limited power source, such as a rechargeable battery 132 which is coupled to a battery interface 134, device design and operation must minimize power consumption in order to extend battery life or time between power source charging operations. Such intermittent operation has a dramatic effect on power consumption of wireless device 102.

Wireless device 102 operates using a Subscriber Identity Module (SIM) 140 which is connected to or inserted in wireless device 102 at a SIM interface 142. Data and control lines 144 are coupled between controller 106 and SIM interface 142. SIM 140 is one type of a conventional "smart card" used to identify an end user (or subscriber) of wireless device 102 and to personalize the device, among other things. Without SIM 140, the wireless device terminal is not fully operational for communication through wireless network 104. By inserting SIM 140 into wireless device 102, an end user can have access to any and all of his/her subscribed services. In order to identify the subscriber, SIM 140 contains some user parameters such as an International Mobile Subscriber Identity (IMSI). In addition, SIM 140 is typically protected by a four-digit Personal Identification Number (PIN) which is stored therein and known only by the end user. An advantage of using SIM 140 is that end users are not necessarily bound by any single physical wireless device. Typically, the only element that personalizes a wireless device terminal is a SIM card. Therefore, the user can access subscribed services using any wireless device equipped to operate with the user's SIM.

As apparent from the above, the term "wireless device" is used herein in reference to a wireless mobile communication device. In the embodiment of FIG. 1, wireless device 102 is a mobile station. Wireless device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108 and antenna 110 may be implemented as a radio modem unit that may be inserted into a port on a laptop computer. In this case, the laptop computer would include display 112, keyboard 114, one or more to auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 402 of FIG. 4.

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and to GGSN 128, which is in turn coupled to a public or private data network 130 (such as the Internet). HLR 132 is coupled to MSC 122, SGSN 126, and GGSN 128.

Base station 120, including its associated controller and antenna tower 118, provides wireless network coverage for a particular coverage area commonly referred to as a "cell". Base station 120 transmits communication signals to and receives communication signals from wireless devices within its cell via antenna tower 118. Base station 120 normally perform's such functions as modulation and possibly encoding and/or encryption of signals to be transmitted to the wireless device in accordance with particular, usually predetermined, communication protocols and parameters, under control of its controller. Base station 120 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless device 102. An RF channel is a limited resource that must be conserved, typically due to limits in overall bandwidth and a limited battery power of wireless device 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all wireless device's 102 registered with a network operator, permanent data (such as wireless device 102 user's profile) as well as temporary data (such as wireless device's 102 current location) are stored in HLR 132. In case of a voice call to wireless device 102, HLR 132 is queried to determine the current location of wireless device 102. A Visitor Location Register (VLR) of MSC 122 is responsible for a group of location areas and stores the data of those wireless devices that are currently in its area of responsibility. This includes parts of the permanent wireless device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of wireless devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by base station 120 instructing wireless device 102 to select a particular cell. Wireless device 102 informs wireless network 104 when it reselects another cell or group of cells, known as a routing area.

In order to access GPRS services, wireless device 102 first makes its presence known to wireless network 104 by performing what is known as a GPRS "attach". This operation establishes a logical link between wireless device 102 and SGSN 126 and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to GGSN 128; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and GGSN 128.

As apparent from the above, the term "network" is used herein to denote fixed portions of the network, including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
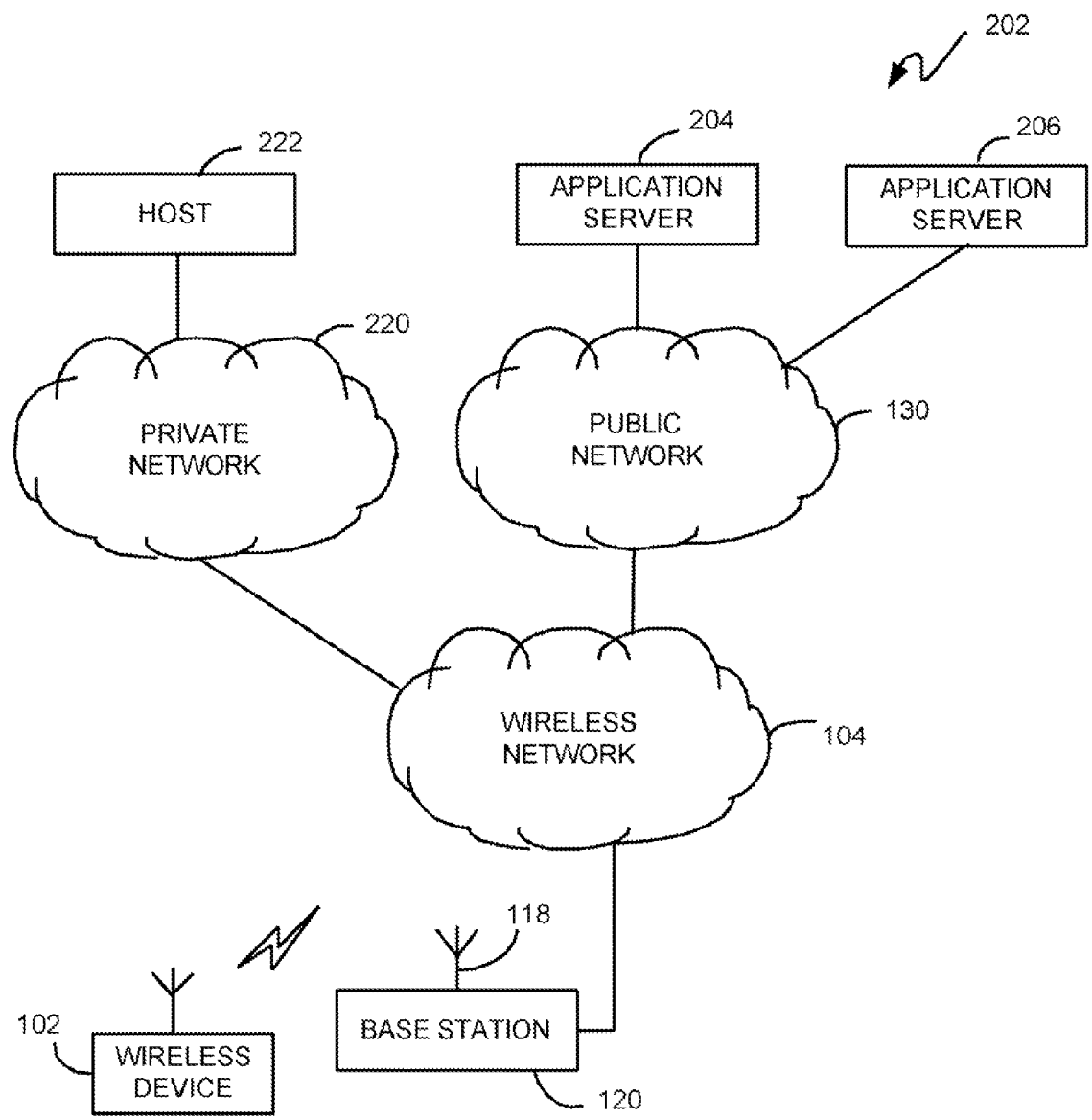
FIG. 2 is an illustration of the wireless communication network having the wireless communication device operating therein for communicating data between one or more application servers through a public or private communication network.

FIG. 2 is a simplified illustration of wireless network 104 having wireless device 102 operating therein for communicating data between one or more application servers 202 through a public or private communication network 130. Network 130 may be or include Internet, and include a serving network to facilitate the communication of information between application servers 202 and wireless device 102. There are three application servers 202 shown in FIG. 2, namely, application servers 204, 206, and 208; however any suitable number of application servers may be employed in the network. Application servers 202 may provide any suitable voice and/or data service(s) for wireless device 102, especially "push"-based services. More specifically, application servers 202 may provide an electronic mail (e-mail) service, a wireless application protocol (WAP) service, a short messaging service (SMS) service, or an application-specific service such as a weather update service, a horoscope service, and a stock market quotation service, as a few examples.

Figure 3:
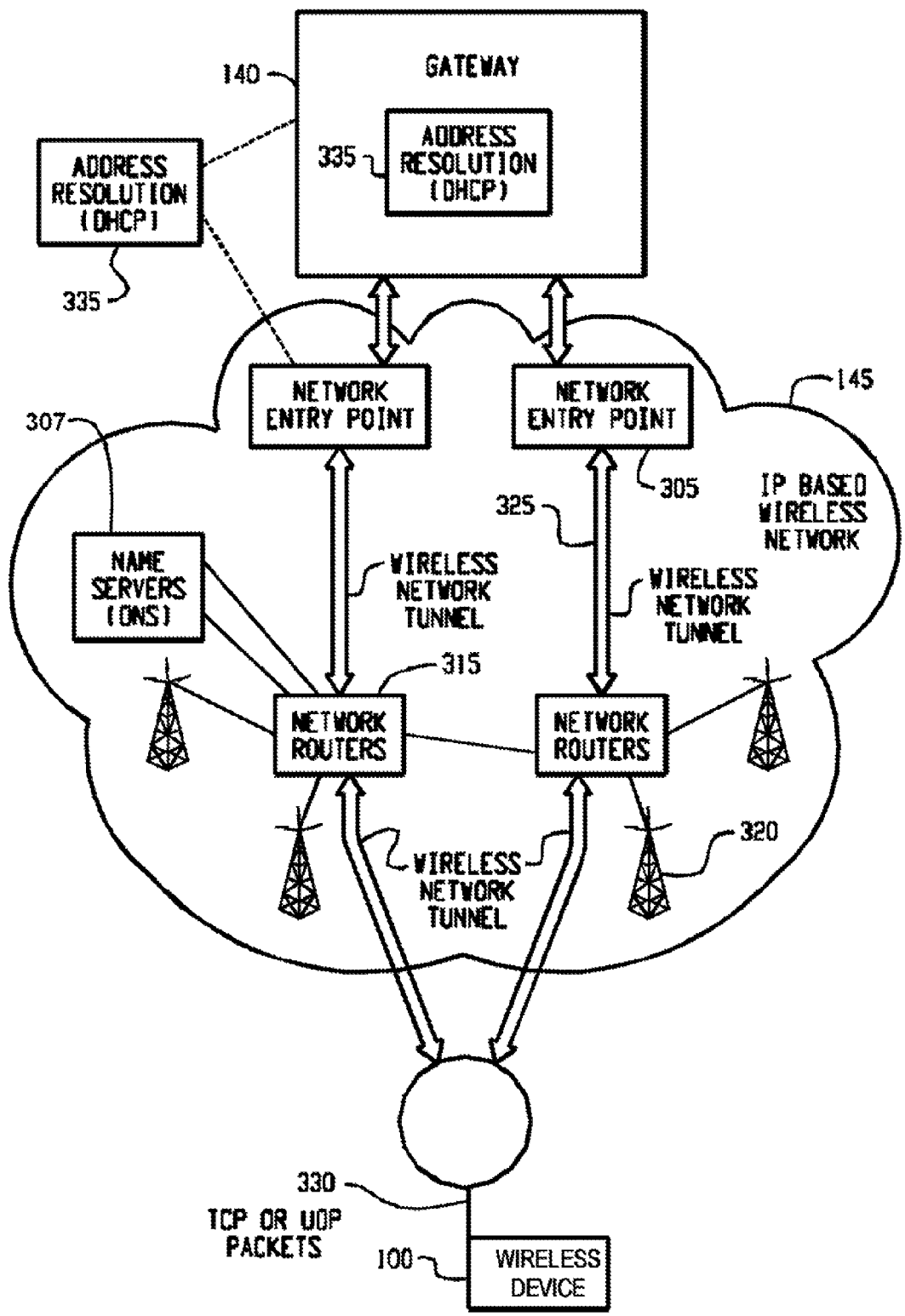
FIG. 3 is a particular structure of a system for communication with the wireless communication device.

FIG. 3 shows a particular system structure for communicating with a wireless communication device. In particular, FIG. 3 shows basic components of an IP-based wireless data network, such as a GPRS network. A wireless device 100 communicates with a wireless packet data network 145, and may also be capable of communicating with a wireless voice network (not shown). Preferably, wireless network 145 provides for "push"-based services to wireless device 100 and other similar devices. Wireless device 100 of FIG. 3 may be wireless device 102 of FIGS. 1 and 2. The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 140 may be coupled to an internal or external address resolution component 335 and one or more network entry points 305. Data packets are transmitted from gateway 140, which is source of information to be transmitted to wireless device 100, through network 145 by setting up a wireless network tunnel 325 from gateway 140 to wireless device 100. In order to create this wireless tunnel 325, a unique network address is associated with wireless device 100. In an IP-based wireless network, however, network addresses are normally not permanently assigned to a particular wireless device 100 but instead are dynamically allocated on an as-needed basis. It is thus preferable for wireless device 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network, routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 100.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, wireless device 100 must use a specific technique associated with wireless network 345. The step of opening such a wireless tunnel 325 may require wireless device 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for wireless device 100. When an IP address has been allocated to wireless device 100 and communicated to gateway 140, information can then be forwarded from gateway 140 to wireless device 100.

Wireless tunnel 325 typically has a limited life, depending on wireless device's 100 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for wireless device 100 when wireless tunnel 325 was first opened. Once the IP address is lost and wireless tunnel 325 is torn down, gateway 140 loses all ability to initiate IP data packets to wireless device 100, whether over Transmission Control Protocol (TCP) or over User Datagram Protocol (UDP).

In this application, the expression "IP-based wireless network" is intended to include, but is not limited to: (1) Code Division Multiple Access (CDMA) network that has been developed and operated by Qualcomm; (2) General Packet Radio Service (GPRS) for use in conjunction with Global System for Mobile Communications (GSM) network both developed by standards committee of European Conference of Postal and Telecommunications Administrations (CEPT); (3) future third-generation (3G) networks like Enhanced Data rates for GSM Evolution (EDGE) and Universal Mobile Telecommunications System (UMTS); and (4) iDEN network technology. GPRS is a data communications overlay on top of GSM wireless network. It is to be understood that although particular IP-based wireless networks have been described, the communication re-establishment schemes of the present application could be utilized in any suitable type of wireless packet data network.

Figure 4:
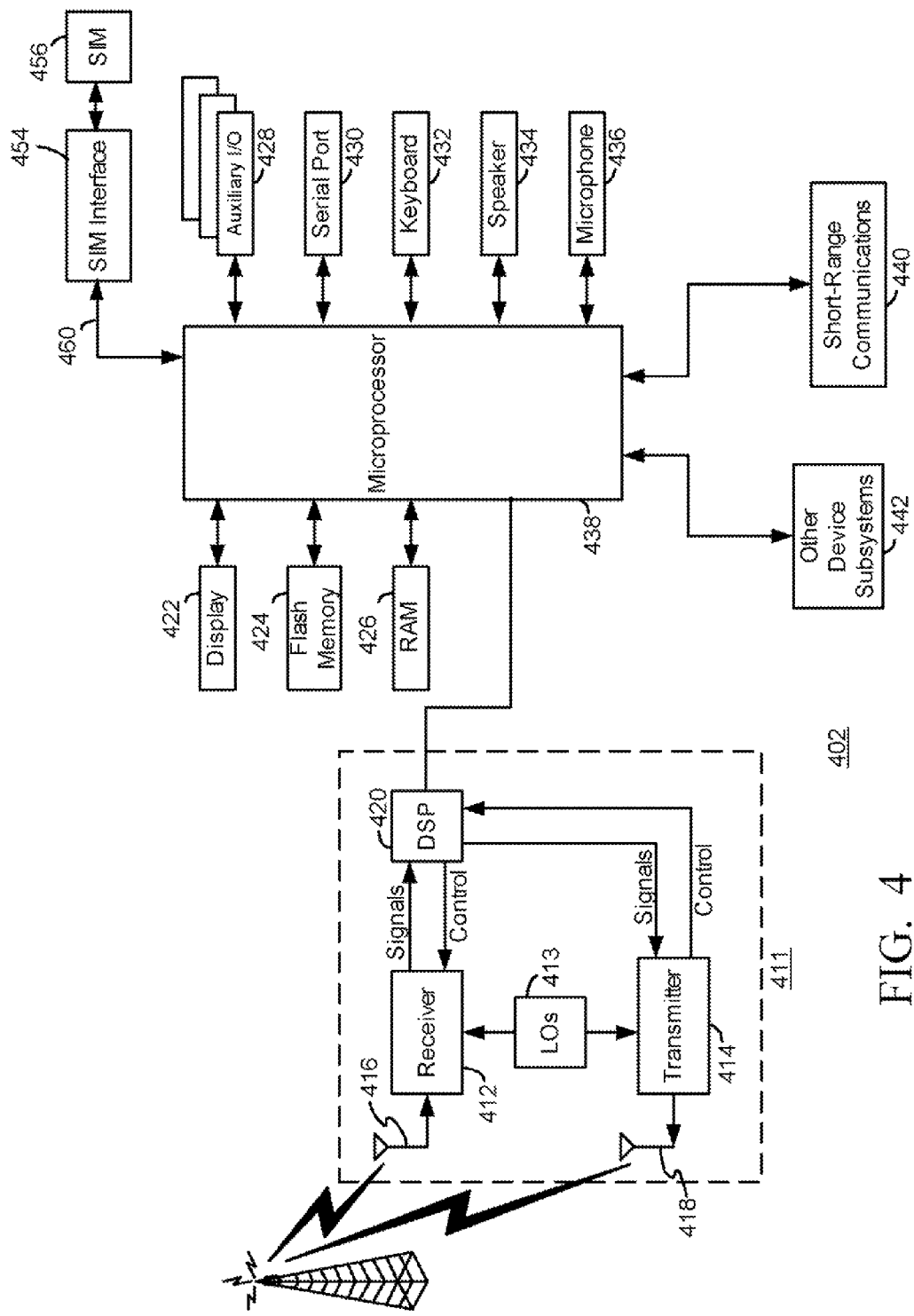
FIG. 4 is a detailed block diagram of a wireless communication device.

FIG. 4 is a detailed block diagram of a wireless communication device 402. Wireless device 402 is preferably a two-way communication device having at least voice and data communication capabilities (e.g. a GSM/GPRS device). Wireless device 402 will normally incorporate a communication subsystem 411, which includes a receiver 412, a transmitter 414, and associated components, such as one or more (preferably embedded or internal) antenna elements 416 and 418, local oscillators (LOs) 413, and a processing module such as a digital signal processor (DSP) 420. Communication subsystem 411 is analogous to RF transceiver circuitry 108 and antenna 110 shown in FIG. 1. As will be apparent to those skilled in field of communications, particular design of communication subsystem 411 depends on the communication network in which wireless device 402 is intended to operate.

Network access requirements will also vary depending upon type of network utilized. In GPRS networks, for example, network access is associated with a subscriber or user of wireless device 402. A GPRS device therefore requires a Subscriber Identity Module, commonly referred to as a "SIM" card 456, in order to operate on the GPRS network. Without such a SIM card 456, a GPRS device will not be fully functional. Local or non-network communication functions (if any) may be operable, but wireless device 610 will be unable to carry out any functions involving communications over the network. SIM card 456 is connected to wireless device 402 via a SIM interface 454 with data and control lines 460 coupled to a microprocessor 438.

When required network registration or activation procedures have been completed, wireless device 402 may send and receive communication signals over the network. Signals received by antenna 416 through the network are input to receiver 412, which may perform such common receiver functions as signal amplification, frequency down conversion, filtering, channel selection, and like, and in example shown in FIG. 4, analog-to-digital (A/D) conversion. A/D conversion of a received signal allows more complex communication functions such as demodulation and decoding to be performed in DSP 420. In a similar manner, signals to be transmitted are processed, including modulation and encoding, for example, by DSP 420. These DSP-processed signals are input to transmitter 414 for digital-to-analog (D/A) conversion, frequency up conversion, filtering, amplification and transmission over communication network via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Wireless device 402 includes a microprocessor 438 (which is one implementation of controller 106 of FIG. 1) which controls overall operation of wireless device 402. Communication functions, including at least data and voice communications, are performed through communication subsystem 411. Microprocessor 438 also interacts with additional device subsystems such as a display 422, a flash memory 424, a random access memory (RAM) 426, auxiliary input/output (I/O) subsystems 428, a serial port 430, a keyboard 432, a speaker 434, a microphone 436, a short-range communications subsystem 440, and any other device subsystems generally designated at 442. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Operating system software used by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426. It is contemplated that the received communication signals, the detected signal log, and loss of contact log may also be stored to RAM 426.

Microprocessor 438, in addition to its operating system functions, preferably enables execution of software applications on wireless device 402. A predetermined set of applications which control basic device operations, including at least data and voice communication applications (such as a network re-establishment scheme), will normally be installed on wireless device 402 during its manufacture. A preferred application that may be loaded onto wireless device 402 may be a personal information manager (PIM) application having the ability to organize and manage data items relating to user such as, but not limited to, e-mail, calendar events, voice mails, appointments, and task items. Naturally, one or more memory stores are available on wireless device 402 and SIM 456 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on wireless device 402 with respect to such items. This is especially advantageous where the host computer system is the wireless device user's office computer system. Additional applications may also be loaded onto wireless device 402 through network, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of wireless device 402 and may provide enhanced on-device functions, communication-related functions, or both. For example, secure communication applications may enable electronic commerce functions and other such financial transactions to be performed using wireless device 402.

In a data communication mode, a received signal such as a text message or web page download will be processed by communication subsystem 411 and input to microprocessor 438. Microprocessor 438 will preferably further process the signal for output to display 422 or alternatively to auxiliary I/O device 428. A user of wireless device 402 may also compose data items, such as e-mail messages or short message service (SMS) messages, for example, using keyboard 432 in conjunction with display 422 and possibly auxiliary I/O device 428. Keyboard 432 is preferably a complete alphanumeric keyboard and/or telephone-type keypad. These composed items may be transmitted over a communication network through communication subsystem 411.

For voice communications, the overall operation of wireless device 402 is substantially similar, except that the received signals would be output to speaker 434 and signals for transmission would be generated by microphone 436. Alternative voice or audio I/O subsystems, such as a voice message recording subsystem, may also be implemented on wireless device 402. Although voice or audio signal output is preferably accomplished primarily through speaker 434, display 422 may also be used to provide an indication of the identity of a calling party, duration of a voice call, or other voice call related information, as some examples. Keyboard 432 may include a conventional-type telephone keypad (e.g. a dual tone multiple frequency (DTMF) keypad) which includes telephone digits 0-9, *, and # for placing telephone calls.

Serial port 430 in FIG. 4 is normally implemented in a personal digital assistant (PDA)-type communication device for which synchronization with a user's desktop computer is a desirable, albeit optional, component. Serial port 430 enables a user to set preferences through an external device or software application and extends the capabilities of wireless device 402 by providing for information or software downloads to wireless device 402 other than through a wireless communication network. The alternate download path may, for example, be used to load an encryption key onto wireless device 402 through a direct and thus reliable and trusted connection to thereby provide secure device communication.

Short-range communications subsystem 440 of FIG. 4 is an additional optional component which provides for communication between wireless device 402 and different systems or devices, which need not necessarily be similar devices. For example, subsystem 440 may include an infrared device and associated circuits and components, or a Bluetooth™ communication module to provide for communication with similarly-enabled systems and devices. Bluetooth™ is a registered trademark of Bluetooth SIG, Inc.

FIGS. 5-6 are flowcharts for describing methods of providing restrictions on long distance calls from a wireless communication device.

These methods may be employed in network or device components shown and described above in relation to FIGS. 1-4. FIG. 5 more specifically relates to a method employed in the network. Beginning at a start block 502 of FIG. 5, long distance call restriction information is stored in user profiles in the host computer network (e.g. a private network) for a group of associated individuals (e.g. a company). Preferably, the call restriction information is entered through a graphical user interface (GUI) by a network administrator. The call restriction information may be unique to each user or subscriber. Next, the long distance call restriction information is pushed from the server to wireless devices corresponding to the user profiles through the wireless communication network (step 506 of FIG. 5). This may occur once, or regularly, or when updates are made to the restriction information.

Reference will now be made to the flowchart of FIG. 6 which refers to a method employed by the wireless device. Beginning at a start block 602 of FIG. 6, the long distance call restriction information is received by and stored in the wireless device (i.e. stored in its memory or SIM) through the wireless network. At some time thereafter, the end user will attempt to make a telephone call with the wireless device. Thus, call attempt information is received at the user interface of the wireless device (step 606 of FIG. 6) (e.g. dialing telephone digits through the keypad or keyboard, or through a voice-activated dialing means, as examples). Next, the wireless device either restricts or allows the telephone call based on the long distance call restriction information (step 608 of FIG. 6).

Some specific examples of step 608 will be described. If, for example, the end user dials a telephone number having the country code "011", and the country code "011" is disallowed by the long distance call restriction information, then the wireless device will prohibit the call request from being transmitted from the wireless device. If, for example, the end user dials a telephone number having the area code "312", and the area code "312" is disallowed by the long distance call restriction information, then the wireless device will prohibit the call request from being transmitted from the wireless device. If, for example, the end user dials a telephone number having the area code "708", and the area code "708" is allowed by the long distance call restriction information, then the wireless device will allow the call request to be transmitted from the wireless device.

The restriction information may be stored in semi-permanent memory of the wireless device, such as an electrically erasable/programmable ROM (EEPROM). The downloadable restriction information may be in any suitable form, for example it may be in the direct form of allowable and/or disallowable country codes and/or area codes. Alternatively, the country codes and/or area codes are stored in permanent memory (e.g. ROM) in a look-up table, where the downloadable restriction information is kept in bit form (e.g. "0" for disallowable code in the ROM look-up table and "1" for allowable code in the ROM look-up table).

In an alternative embodiment, the long distance call restriction information is kept stored in the user profile in the network but it is not pushed out and stored at the wireless device. In this embodiment, each time the subscriber places a telephone call that is identified as being outside the subscriber's region (i.e. it is a long distance call), a query request is first made from the wireless device to the server (e.g. using its IP address) in the private network. In response to the query request, the server immediately performs a look-up in the user profile and responds to the device as to whether the call should be prohibited or not based on the long distance call restriction information. The wireless device then restricts or allows the long distance call in accordance with this response. If the call is restricted, the wireless device provides an alert indication to the user via the user interface. If the call attempt from the wireless device is not a long distance call, no such query request is transmitted from the wireless device and the call is allowed as normal.

Conclusion. Thus, methods and apparatus for providing restrictions on long distance calls from wireless communication devices which operate in a wireless communication network have been described. The wireless devices are preferably combined voice and data communication devices. In one illustrative example, each wireless device receives and stores long distance call restriction information which is pushed from a private computer network through the wireless network. During typical operation, a wireless device determines whether call attempts from the wireless device are restricted by the long distance call restriction information. If a call attempt is restricted by the long distance call restriction information, the wireless device restricts the call attempt from the wireless device and provides for a call restriction alert indication (e.g. an alert tone or visual text). If a call attempt is not restricted by the long distance call restriction information, the wireless device allows the call attempt from the wireless device. Advantageously, control over long distance calls may be established on a per-user basis in the private home network.

A wireless communication device includes a radio modem which receives long distance call restriction information from a host computer; memory which stores the long distance call restriction information; a user interface which receives a telephone call attempt from an end user of the wireless device; and a controller. The controller determines whether the call attempt is restricted by the long distance call restriction information; restricts the call attempt from the wireless device if the call attempt is restricted by the long distance call restriction information; but allows the call attempt from the wireless device if the call attempt is not restricted by the long distance call restriction information.

Alternative techniques are also provided. In a wireless communication device, a method of providing restrictions on long distance calls from the wireless communication device may include the steps of receiving from a user interface a plurality of telephone call digits of a telephone number; transmitting to a host computer network a query request to identify whether a telephone call to the telephone number should be restricted based on long distance call restriction information stored in the host computer network; receiving a response to the query request from the host computer network; allowing the telephone call if the response is positive; and restricting the telephone call and providing an audible or visual alert at the wireless device if the response is negative.

In a server of a computer network, a method of providing restrictions on long distance calls from a wireless communication device may include the steps of maintaining storage of long distance call restriction information in a user profile; receiving a query request from a wireless communication device which is attempting to place a telephone call to a telephone number, where the query request includes data indicative of a country code or area code of the telephone number; searching the long distance call restriction information to identify whether the telephone call with the country code or area code should be allowed or restricted; and transmitting a response to the wireless device as to whether the telephone call is allowed or restricted.

The above-described embodiments of invention are intended to be examples only. Alterations, modifications, and variations may be effected to particular embodiments by those of skill in art without departing from scope of invention, which is defined solely by claims appended hereto.

What is claimed is:

1. A method in a wireless communication device for use in providing restrictions on communications of the wireless communication device via a cellular network, the method comprising:
   communicating with a server of a private network which is external to the cellular network for performing data synchronization, over a wireless link of the cellular network, for data items of a personal information manager application of the wireless device and corresponding data items stored in association with the server;
   receiving communication restriction information from the server in the private network, the communication restriction information being associated with an IT policy of a group of the private network, the communication restriction information being indicative of one or more codes, wherein the one or more codes comprise one or more country codes;

storing the communication restriction information received from the server;

determining whether a communication of the wireless device is restricted by comparing a user selected code of a communication attempt from the wireless device with the one or more codes of the communication restriction information;

if the communication is determined to be restricted based on the comparing, then disallowing the communication via the cellular network; and if the communication is determined to not be restricted based on the comparing, then allowing the communication via the cellular network.

2. The method of claim 1, wherein the wireless device is associated with a subscriber region for communications, and the communication restriction information disallows communications outside of the subscriber region.

3. The method of claim 1, further comprising:
for the communication: making a query request to server, and receiving a response as to whether the communication should be allowed or disallowed.

4. The method of claim 1, wherein the one or more codes are selected via a graphical user interface.

5. The method of claim 1, wherein communication restriction information is received periodically from the server in the private network.

6. The method of claim 1, further comprising:
receiving updates of the communication restriction information from the server in the private network when updates exist.

7. The method of claim 1, further comprising:
establishing a tunnel connection via the cellular network through which the communication restriction information is pushed to the wireless device.

8. The method of claim 1, wherein the user data items of the personal information manager application comprise at least one of e-mail message data items and calendar event data items.

9. The method of claim 1, wherein the server comprises a host enterprise server.

10. The method of claim 1, wherein the communication restriction information comprises one or more area codes designating one or more regions for the communication.

11. A wireless communication device, comprising:
a radio frequency (RF) transceiver which is configured to provide communications via a cellular network;
memory for use in storing a personal information manager application;
a user interface which is configured to receive an attempt to establish a communication;
a controller coupled to the RF transceiver, the memory, and the user interface;
the controller being configured to:
communicate with a server of a private network which is external to the cellular network for performing data synchronization, over a wireless link of the cellular network, for data items of the personal information manager application and corresponding data items stored in association with the server;
receive, via the RF transceiver, communication restriction information from the server in the private network, the communication restriction information being associated with an IT policy of a group of the private network, the communication restriction information being indicative of one or more codes, wherein the one or more codes comprise one or more country codes;
store, in the memory, the communication restriction information received from the server;
determine whether a communication of the wireless device is restricted by comparing a user selected code of a communication attempt from the wireless device with the one or more codes of the communication restriction information;
if the communication is determined to be restricted based on the comparing, then disallow the communication via the cellular network; and
if the communication is determined to not be restricted based on the comparing, then allow the communication via the cellular network.

12. The wireless device of claim 11, wherein the controller is further configured to establish, with use of the RF transceiver, a tunnel connection via the cellular network through which the communication restriction information is pushed to the wireless device.

13. The wireless device of claim 11, wherein the server comprises a host enterprise server.

14. The wireless device of claim 11, wherein the controller is configured to periodically receive communication restriction information from the server in the private network.

15. The wireless device of claim 11, wherein the controller is further configured to receive updates of the communication restriction information from the server in the private network when updates exist.

16. The wireless device of claim 11, wherein the user data items of the personal information manager application comprise at least one of e-mail message data items and calendar event data items.

17. The wireless device of claim 11, wherein the communication restriction information comprises one or more area codes designating one or more regions for the communication.

18. The wireless device of claim 11, which is associated with a subscriber region for communications, and the communication restriction information disallows communications outside of the subscriber region.

19. The wireless device of claim 11, wherein the controller is further configured to send via the RF transceiver a query request to the server and receive via the RF transceiver a response as to whether the communication should be allowed or disallowed.

20. The wireless device of claim 11, wherein the controller is further configured to receive the communication restriction information via a packet data service of the cellular network.

21. A method in a wireless communication device for use in providing restrictions on communications of the wireless communication device via a cellular network, the method comprising:
communicating with a server of a private network which is external to the cellular network for performing data synchronization, over a wireless link of the cellular network, for data items of a personal information manager application of the wireless device and corresponding data items stored in association with the server;
receiving communication restriction information from the server in the private network, the communication restriction information being indicative of one or more codes, wherein the one or more codes comprise one or more country codes;

storing the communication restriction information received from the server;

determining whether a communication of the wireless device is restricted by comparing a user selected code of a communication attempt from the wireless device with the one or more codes of the communication restriction information;

if the communication is determined to be restricted based on the comparing, then disallowing the communication via the cellular network;

if the communication is determined to not be restricted based on the comparing, then allowing the communication via the cellular network; and receiving updates of the communication restriction information from the server in the private network when updates exist.

22. The method of claim 21, wherein the communication restriction information is associated with an IT policy of a group of the private network.

23. The method of claim 21, wherein the user data items of the personal information manager application comprise at least one of e-mail message data items and calendar event data items.

24. The method of claim 21, wherein the server comprises a host enterprise server.

25. The method of claim 21, wherein the communication restriction information further comprises one or more area codes designating one or more regions for the communication.

* * * * *